June 3, 1952   W. A. DEPP   2,598,677
MULTICATHODE GLOW DISCHARGE DEVICE
Filed Dec. 15, 1949   5 Sheets-Sheet 1

INVENTOR
W. A. DEPP
BY
ATTORNEY

June 3, 1952

W. A. DEPP 2,598,677

MULTICATHODE GLOW DISCHARGE DEVICE

Filed Dec. 15, 1949

INVENTOR
W. A. DEPP
BY
ATTORNEY

June 3, 1952 W. A. DEPP 2,598,677
MULTICATHODE GLOW DISCHARGE DEVICE
Filed Dec. 15, 1949 5 Sheets-Sheet 3

INVENTOR
W. A. DEPP
BY
ATTORNEY

June 3, 1952 W. A. DEPP 2,598,677
MULTICATHODE GLOW DISCHARGE DEVICE
Filed Dec. 15, 1949 5 Sheets-Sheet 4

FIG. 10

TO STEP DISCHARGE TO RIGHT
 CONNECT 5 TO 3 AND 7 TO 1
 APPLY PULSES TO 3

TO STEP DISCHARGE TO LEFT
 CONNECT 5 TO 1 AND 7 TO 3
 APPLY PULSES TO 3

TO STEP DISCHARGE DOWNWARDLY
 CONNECT 4 TO 2 AND 6 TO 1
 APPLY PULSES TO 2

TO STEP DISCHARGE UPWARDLY
 CONNECT 4 TO 1 AND 6 TO 2
 APPLY PULSES TO 2

INVENTOR
W. A. DEPP
BY
ATTORNEY

INVENTOR
W. A. DEPP
BY
ATTORNEY

Patented June 3, 1952

2,598,677

UNITED STATES PATENT OFFICE 2,598,677

MULTICATHODE GLOW DISCHARGE DEVICE

Wallace A. Depp, Summit, N. J., assignor to Bell Telephone Laboratories, Incorporated, New York, N. Y., a corporation of New York Application December 15, 1949, Serial No. 133,196

23 Claims. (Cl. 313—188)

This invention relates to multicathode glow discharge devices, and more particularly to such devices of the type disclosed in the applications Serial No. 101,322, filed June 25, 1949, now Patent No. 2,575,370 of M. A. Townsend and Serial No. 133,134, filed December 15, 1949 of H. L. Von Gugelberg.

Devices of the type disclosed in the applications above identified comprise, in general and in one form, a row or array of electrodes at least alternate ones of which are adapted for use as glow cathodes, and an anode in cooperative relation with the electrodes. The electrodes are constructed and arranged so that in reponse to signal pulses applied to the electrodes in the row or array connected in two groups in alternate relation, stepping of the discharge is effected from cathode to cathode in one preassigned direction. Stepping of the discharge in this direction is attained by what has been termed a preference mechanism, which may be viewed broadly as a physical or electrical association or orientation of the electrodes whereby when a pulse is applied to two electrodes on opposite sides of a cathode at which a discharge obtains, conditions are established in the immediate vicinity of this cathode which are strongly conducive to the establishment of a discharge at one of the electrodes but poorly conducive to the establishment of a discharge at the other of these electrodes. In one form, disclosed in the application of M. A. Townsend above identified, this mechanism involves an asymmetrical construction of the individual electrodes and a particular relative orientation of the several electrodes in the row or array. In another form, disclosed in the application of H. L. Von Gugelberg above identified, the preference mechanism involves electrically associating each of the electrodes intermediate the respective pair of cathodes with these cathodes in such manner that upon application of a signal pulse the intermediate electrode functions to inject electrical carriers, for example ions, toward the cathode-anode gap which is in the desired direction relative to the gap at which the discharge obtains.

One general object of this invention is to enhance the functional possibilities and to enlarge the fields of utility of multicathode discharge devices.

In accordance with one broad feature of this invention, in a multicathode glow discharge device a preference mechanism is provided whereby stepping of a discharge from cathode to cathode may be effected selectively in two or more dimensions or directions.

In accordance with a more specific feature of this invention, in a discharge device comprising a plurality of electrodes mounted in a row, which may be rectilinear, circular or of other configuration, and wherein the electrodes of one alternate group are glow cathodes, means are provided for selectively electrically associating the other electrodes with the cathodes in such manner that the discharge at any cathode can be stepped to either the next succeeding or next preceding cathode in the row. Thus the device may be utilized, for example, for shifting the discharge to any one of the plurality of cathodes in accordance with the algebraic summation of groups of pulses or more generally to effect such summation of pulses.

In accordance with another specific feature of this invention, the electrodes are mounted in orthogonally related rows for example in a rectangular array, and are constructed and arranged so that the discharge can be stepped selectively along both coordinates of the array; thus, and for example, the device may be utilized for the addition and subtraction of complex numbers or vectors.

In accordance with a further specific feature of this invention, the electrodes are arranged in a three-dimensional array and are cooperatively associated so that the discharge can be stepped selectively along each of the three coordinate dimensions of the array.

In accordance with still another feature of this invention, in devices having cathodes disposed in a two- or three-dimensional array, means are provided whereby the discharge may be stepped from cathode to cathode selectively in either direction in each of the dimensions of the array.

The invention and the above noted and other features thereof will be understood more clearly and fully from the following detailed description with reference to the accompanying drawing, in which.

Figure 1:
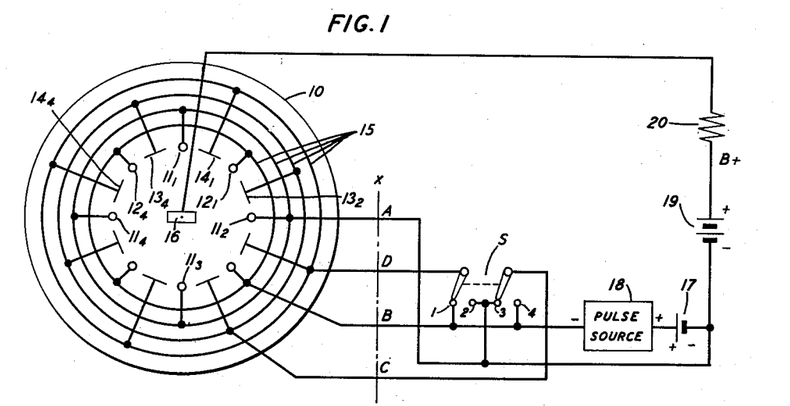
Fig. 1 is in part a diagram of a discharge device and in part a circuit schematic illustrating one embodiment of this invention particularly suitable for effecting selective stepping of the discharge in either direction along a row of cathodes.

Referring now to the drawing, the glow discharge device illustrated in Fig. 1 comprises an enclosing vessel 10 having therein an ionizable atmosphere, for example a rare gas such as helium or neon or a mixture of rare gases. Mounted within the vessel 10 and disposed in circular array are two groups of cold cathodes 11 and 12, hereinafter referred to as A and B cathodes, respectively, the cathodes of the two groups being in alternate relation. Also mounted in the circular array and intermediate the glow cathodes are two groups of auxiliary electrodes 13 and 14, referred to hereinafter as C and D electrodes, respectively. The electrodes of each of the groups aforementioned are connected together electrically by bus bars or rings 15 and thereby to the respective one of terminals A, B, C, or D. Mounted opposite the cathodes and uniformly spaced therefrom is an anode 16.

In the operation of the device, the A cathodes are biased negative with respect to the auxiliary or B cathodes by a suitable source 17 and a pulse source 18 is provided for driving the B cathodes negative with respect to the A cathodes. All of the cathodes are biased negative with respect to the anode 16 by a source 19 connected to the anode through a resistor 20, the anode-cathode potential being somewhat above the sustaining voltage. The C and D electrodes are connected to the blades of a switch S having terminals 1, 2, 3, and 4, in such manner that the C and D electrodes may be connected selectively to either the A or B cathodes. Specifically, as will be apparent from Fig. 1, when the switch S is in the position shown, that is so the terminals 1 and 3 are engaged, the D electrodes are tied to the auxiliary or B cathodes and the C electrodes are tied to the A cathodes. Conversely, when the switch is in the position such that the terminals 2 and 4 are engaged, the D electrodes are tied to the A cathodes and the C electrodes are tied to the B cathodes. Thus, upon application of negative pulses from the source 17, it will be noted that either the C or D electrodes are driven negative with respect to the A cathodes.

The operation of the device will be better understood from the following analysis. Assume that a discharge is sustaining at the gap between the A cathode $11_1$ and the anode 16 and that the switch S is in the position illustrated in Fig. 1, whereby as has been pointed out hereinabove, the D electrodes are tied to the B cathodes and the C electrodes are tied to the A cathodes. If now a pulse is applied from the source 18, the D electrodes and B cathodes are driven negative relative to the A cathodes and the C electrodes. Thus, the D electrode $14_1$ and the B cathode $12_1$ will be driven negative relative to the A cathode $11_1$, whereas the C electrode $13_4$ will be at substantially the potential of the A cathode $11_1$. As a result, ions from the discharge sustaining at the A cathode $11_1$ are injected into the gap between the anode and the electrode $14_1$ whereby a discharge is initiated in the latter gap. Because of the greater efficiency of the cathodes than the auxiliary electrodes as glow discharge elements, the discharge initiated at the gap associated with electrode $14_1$ will shift to and concentrate at the cathode $12_1$. Upon cessation of the pulse, the auxiliary electrode $13_2$ and cathode $11_2$ become negative relative to the cathode $12_1$, whereas the electrode $14_1$ remains at substantially the same potential as the cathode $12_1$. Thus, the discharge shifts toward the gaps between the anode and the electrodes $13_2$ and $11_2$ and because of the preference mechanism above indicated, concentrates upon the electrode $11_2$. Upon application of succeeding pulses, the discharge will be stepped similarly in a clockwise direction in Fig. 1 around the circular row of electrodes advancing from each A cathode to the next succeeding one in response to each pulse.

Assume now that the switch S is in the position such that terminals 2 and 4 are engaged whereby, as indicated hereinabove, the D electrodes are tied to the A cathodes and the C electrodes are tied to the B cathodes. Assume also that the discharge is sustaining at the A cathode $11_1$ and a negative pulse is applied by the source 18. This pulse, it will be noted, drives both the B cathodes and the C electrodes negative with respect to the A cathodes. Thus, ions from the discharge between the A cathode $11_1$ and the anode 16 are attracted by virtue of the negative potential upon the C electrode $13_4$ toward the gaps between the anode and this auxiliary electrode and the B cathode $12_4$. Hence, the discharge transfers from the A cathode $11_1$ to these electrodes and concentrates upon the B cathode $12_4$. Upon cessation of the pulse, both the D electrode $14_4$ and the A cathode $11_4$ become negative relative to the B cathode $12_4$ and, as a result, the discharge is stepped to and concentrates upon the A cathode $11_4$. Succeeding pulses effect stepping of the discharge in a counter-clockwise direction around the row, the discharge advancing from one A cathode to the next in response to each pulse.

It will be apparent from the foregoing that the discharge may be stepped in either direction, clockwise or counter-clockwise, around the row of cathodes, the direction of stepping being determined by the position of the switch S. Thus, the device may be utilized for effecting addition or subtraction of groups of pulses, the ultimate position of the pulse being indicative of the sum or difference of the number of pulses in the groups.

This position may be determined visually by direct observation of the glow discharge or by use of a recorder, as in the manner disclosed in the application of M. A. Townsend, heretofore identified. Furthermore, the discharge may be shifted from any one cathode considered as the first or starter cathode to any one of the other A cathodes by the application of suitable groups of pulses. Individual load circuits may be associated with the A cathodes as in the manner disclosed in the Townsend application referred to. Thus, electronic switching may be effected by the device through the agency of groups of pulses.

Although in the specific embodiment of the invention illustrated in Fig. 1 eight cathodes and a corresponding number of auxiliary electrodes are provided, it will be understood that a greater or lesser number may be utilized. Also, although the electrodes have been shown as disposed in circular array, they may be arranged in a rectilinear row or array of other configurations. Further, an auxiliary or starter cathode may be provided as in the device disclosed in the aforementioned Townsend application for providing a starting point and reset position.

Figure 2:
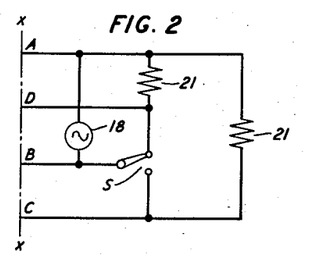
Fig. 2 is a circuit schematic showing a modification of the embodiment of this invention illustrated in Fig. 1.

Fig. 2 illustrates a modification of the embodiment of the invention illustrated in Fig. 1 which has certain advantages from the standpoint of simplicity of the circuitry required to effect switching of the C and D electrodes relative to the A and B cathodes. Specifically, as shown in Fig. 2, the C and D electrodes are connected permanently through resistors 21 to the A cathodes and the B cathodes are selectively associated with either the C or D electrodes by the switch S. The resistors 21 are of such value that the C and D electrodes when not connected to the B electrodes by the switch S are at substantially the potential of the A cathodes except during the discharge transfer interval. During this interval, the resistors 21 provide a bias on the C or D electrodes which is of the polarity to aid the establishment of the discharge at the associated A or B cathode. The operation of the device wherein the pulses are applied in the manner illustrated in Fig. 2 is essentially the same as in the case of Fig. 1 as described hereinabove.

Figure 3:
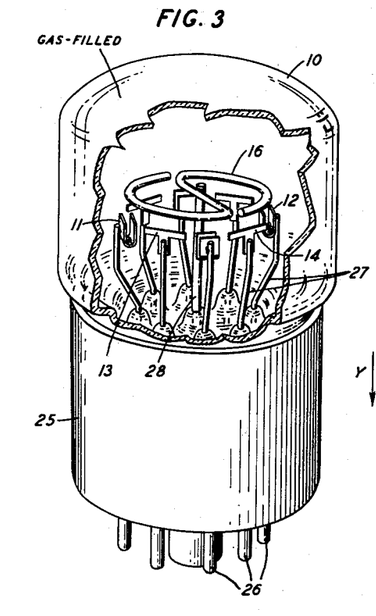
Fig. 3 is a perspective view of a multicathode glow discharge device constructed in accordance with features of this invention, a portion of the enclosing vessel being broken away to show the construction of the internal elements more clearly.

One physical construction of a device of the type above-described is illustrated in Fig. 3. As shown in this figure, the vitreous enclosing vessel 10 is affixed to a base 25, which may be of conventional construction, having thereon terminal prongs 26 by way of which connection to the electrodes may be established. The A and B cathodes 11 and 12, respectively, are connected individually to respective terminal prongs 26 by rigid leading-in conductors 27. Each of the cathodes is of U-shaped or channel form and may be fabricated of a sheet of refractory metal such as molybdenum. The auxiliary electrodes 13 and 14 also are supported individually by leading-in conductors 27. Each auxiliary electrode, which also may be of a refractory material such as molybdenum, is of T configuration, the stem of the T being welded to the respective leading-in conductor 27 and the bar of the T extending between two adjacent A and B cathodes and having its ends in immediate proximity thereto. The cathodes and auxiliary electrodes are disposed in circular array in the manner shown in Fig. 1. The anode 16 comprises two substantially concentric semicircular portions joined by a cross-arm which is affixed to a leading-in conductor 28 connected to one of the terminal prongs 26. The anode 16 is concentric with the circular array aforementioned and of such diameter that it overlies the cathodes and auxiliary electrodes.

The invention may be utilized also to effect selective stepping of the discharge in two or more coordinate dimensions. In this case, two general principles involved are the construction and arrangement of electrodes such that the discharge may be shifted in any one of the two or more coordinate dimensions toward a respective B cathode and also so that the discharge may be shifted to an A cathode in the direction from any one of two or more adjacent B cathodes. One form of such device for effecting selective stepping of the discharge in two coordinate dimensions is illustrated in Figs. 4 to 8, inclusive. In Figs. 4 to 7, inclusive, the A cathodes are indicated by the open circles and the B cathodes are indicated by full circles.

Figure 4:
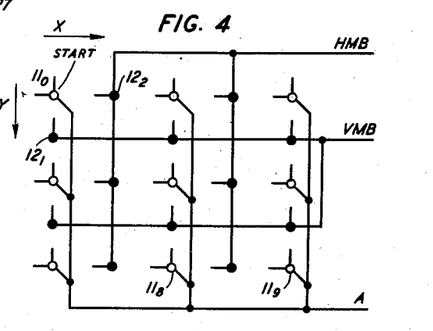
Fig. 4 is a diagram illustrating the construction and association of the electrodes in another embodiment of this invention particularly suitable for selective stepping of the discharge in two coordinate dimensions.
Figures 5, 6, 7, 8:
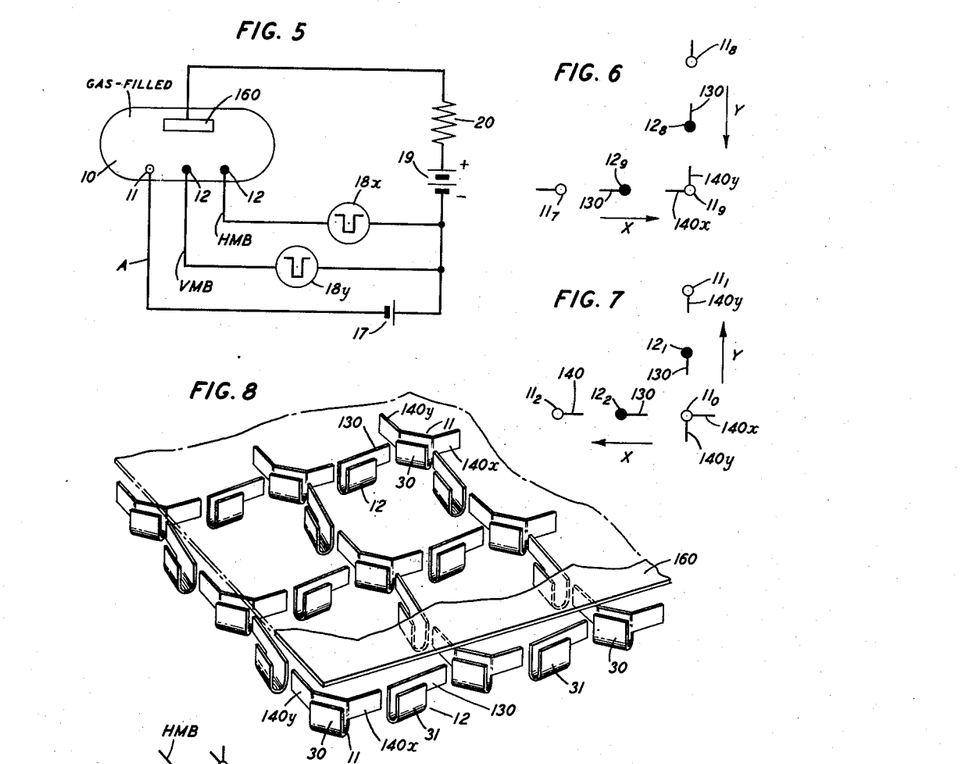
Fig. 5 is a circuit schematic showing one manner of operating a device of the construction illustrated in Fig. 4.
Figs. 6 and 7 are detail diagrams which will be referred to hereinafter in the discussion of principles of operation of the device illustrated in Fig. 4.
Fig. 8 is a fragmentary perspective view illustrating one physical form of the electrodes in a device of the type shown in Fig. 4.

As illustrated in Figs. 4 and 8 the several cathodes are arrayed in orthogonally related rows. All of the A cathodes as shown in Fig. 4 are connected together electrically to a common lead A. One group of B cathodes in parallel rows extending in one of the coordinate dimensions is connected to a common bus HMB and the B cathodes in a second group in parallel rows are connected to a second common bus VMB.

As shown most clearly in Fig. 8, each of the A cathodes comprises a channel or U-shaped body portion 30 and two tabs 140 extending from the central portion 30, the tabs bearing the letters X and Y in accordance with the usual two coordinate plane system designation. Each of the auxiliary or B cathodes 12 comprises a channel or U-shaped body portion 31 and a planar tab 130, the channel portion 31 being immediately adjacent the tab 140X or 140Y of an adjacent A cathode and the tab portion 130 extending into immediate proximity to the channel portion of another A cathode. The anode 160 may be in the form of a plate overlying the A and B cathodes. The cathodes may be formed of a refractory metal such as molybdenum. As pointed out in the application of M. A. Townsend identified hereinabove the channel-shaped portion 30 or 31 of the cathode has much greater efficiency as a glow discharge element than the plane tabs 130 or 140. Thus when a discharge obtains at any of the cathodes it concentrates at the channel-shaped portion thereby producing a high ionization density in the region thereof.

As will appear presently, the tabs function as discharge initiating or directing elements, being analogous in their performance to the auxiliary electrodes 13 and 14 in the device of Fig. 1 as hereinbefore described.

The principles of operation in the two coordinate dimensional device will be understood by reference to Figs. 6 and 7. Referring first to Fig. 7, assume that the discharge is sustaining at the A cathode $11_0$. This discharge may be stepped to the A cathode $11_1$ by driving the B cathode $12_1$ negative with respect to the cathode $11_0$. Upon application of the negative pulse to the cathode $12_1$ the discharge transfers from the A cathode $11_0$ to the B cathode $12_1$ concentrating upon the channel-shaped portion thereof whereby a high ionization density is established in the region toward which the tab $140Y$ of the A cathode $11_1$ projects. By virtue of the greater efficiency of the channel portion of cathode $11_0$ than the tab $140Y$ thereof as a discharge element, a preference mechanism is establihed whereby the discharge is directed toward the B cathode $12_1$ upon application of a pulse to the latter. Upon cessation of the pulse, the A cathodes become negative relative to the B cathode $12_1$ and by virtue of the preference mechanism due to the tab $140Y$ projecting in proximity to the high ionization density region adjacent the cathode $12_1$, the discharge steps to the cathode $11_1$. Thus by applying a negative pulse to the B cathodes connected to the bus VMB, which corresponds to the Y coordinate in Fig. 7, the discharge may be stepped from any A cathode to the next succeeding A cathode for each pulse.

If with the discharge sustaining at the cathode $11_0$ the B cathodes connected to the bus HMB are driven negative the discharge will be stepped in the horizontal or X direction. Specifically referring to Fig. 7, the discharge will shift from the A cathode $11_0$ to the B cathode $12_2$ upon application of the negative pulse and then shift to the A cathode $11_2$ upon cessation of the pulse. Thus it will be appreciated that a discharge sustaining at any A cathode can be stepped selectively in either of the two coordinate dimensions upon application of a negative pulse to the respective group of B cathodes.

Referring now to Fig. 6, assume that a discharge is sustaining at the A cathode $11_8$ and that a negative pulse is applied to the group of B cathodes including the B cathode $12_8$ connected to the bus VMB. It will be evident from the foregoing discussion that in response to this pulse the discharge will be stepped to the A cathode $11_9$. Similarly, if the discharge is sustaining at the cathode $11_7$ and a negative pulse is applied to the group of B cathodes including cathode $12_9$ the discharge will be stepped in the direction from A cathode $11_7$ to A cathode $11_9$.

From the foregoing analysis, it will be manifest that in a device having the electrodes constructed and arranged as illustrated in Fig. 8 and electrically associated as illustrated in Fig. 4 the discharge may be stepped selectively in either of two coordinate dimensions. For example, referring to Fig. 4, it may be stepped from the A cathode $11_0$ to the A cathode $11_9$ by the application of two negative pulses to the bus HMB and two negative pulses to the bus VMB. Also, for example, it may be stepped from the A cathode $11_0$ to the A cathode $11_8$ by the application of two negative pulses to the bus VMB and one negative pulse to the bus HMB. In an analogous manner it will be evident that the discharge may be stepped from the cathode $11_0$ to any one of the other cathodes by application of the appropriate number of pulses to the two buses HMB and VMB; thus selective stepping is effected in accordance with the addition of two groups of pulses.

The basic circuit including devices of the construction just described is illustrated in Fig. 5. As therein shown, the A cathodes are biased negative relative to the auxiliary or B cathodes by the source 17 and the anode is biased positive relative to all of the cathodes by the source 19 in series with the resistor 20. Individual pulse sources 18X and 18Y are provided for the two groups of B cathodes each effective to drive the respective group of B cathodes negative with respect to the A cathodes.

Although in the embodiment of the invention illustrated in Figs. 4 to 8, inclusive, but nine A cathodes have been shown it will be understood, of course, that a greater number may be employed. For example, in a particularly advantageous construction ten rows of ten A cathodes each may be utilized and an auxiliary starter or reset cathode utilized as in the application of M. A. Townsend heretofore identified. In such construction the discharge may be shifted from the starter or reset cathode to any one of the one hundred A cathodes.

The position of the discharge following application of the groups of pulses is indicative of the vector sum of the pulses in these two groups, the position being representative of the expression $AX+BY$; thus the device may be utilized for the representation or addition of complex quantities.

It will be understood also that individual load circuits may be coupled to the A cathodes as in the manner disclosed in the Townsend application whereby the device may be utilized as a selective switch for closing any one of a multiplicity of circuits in response to application of the proper number of pulses to the buses HMB and VMB.

It will be noted that in the device illustrated in Figs. 4 to 8, inclusive, the stepping is unidirectional in each of the two coordinate dimensions. That is, for the construction illustrated in Fig. 4, the discharge can be stepped only to the right in the horizontal or X dimension and only downwardly in the vertical or Y dimension. However, by utilizing principles of the device illustrated in Fig. 1 and heretofore described, bidirectional stepping in both of the two coordinate dimensions may be realized.

Figures 9A, 9B, 14, 15:
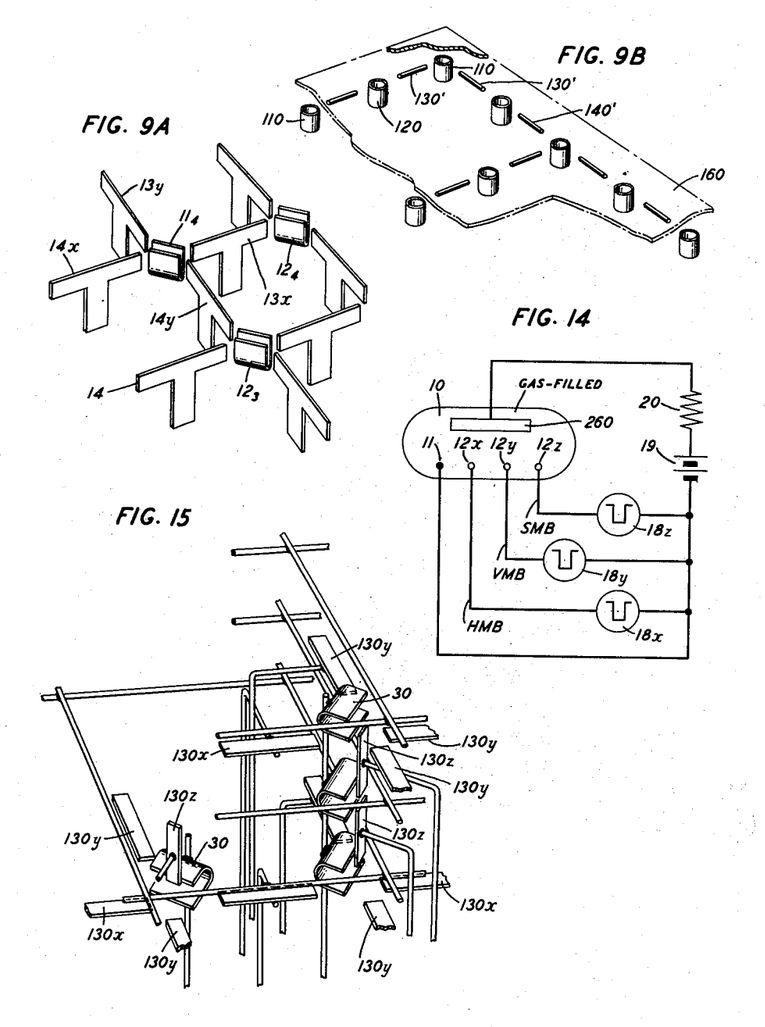
Figs. 9A and 9B are fragmentary perspective views showing modifications of the embodiment of the invention illustrated in Figs. 4 to 8, inclusive, and particularly suitable for selective stepping of the discharge in either direction in each of two coordinate dimensions.
Fig. 14 is a circuit schematic showing one manner in which the device illustrated in Figs. 11 to 13 may be operated.
Fig. 15 is a fragmentary perspective view illustrating a modification of the embodiment of this invention shown in Figs. 11 to 13 and particularly suitable for selective stepping of the discharge in either direction in each of three coordinate dimensions.

A construction suitable for this purpose is illustrated in Fig. 9A. As therein shown, the A and B cathodes are channel-shaped and do not have tabs such as in the construction illustrated in Fig. 8. However, intermediate each pair of A and B cathodes there is provided a T-shaped auxiliary electrode 13 or 14 as in the device illustrated in Fig. 3. By appropriate interconnection of auxiliary electrodes and the B cathodes a mechanism is established whereby the discharge may be selectively stepped from any A cathode in either direction in either dimension. Thus, referring to Fig. 9A, assume that the discharge is sustaining at the A cathode $11_4$ and the auxiliary electrode $13X$ is tied to the B cathode $12_4$. Then if a negative pulse is applied to the group of B cathodes, including the cathode $12_4$, the discharge will be shifted in the direction from the A cathode $11_4$ to the B cathode $12_4$ and thence to the A cathode beyond and to the right of the cathode $12_4$. On the other hand, assume that the auxiliary electrode $14X$ is driven negative when a pulse is applied to the B cathodes connected to the bus HMB. Then, as will be apparent from the discussion hereinabove of the device illustrated in Fig. 1, in response to a pulse applied to the bus HMB the discharge will be shifted in the direction to the left and in the X coordinate from the cathode $11_4$.

In like manner by appropriate interconnection of the auxiliary electrodes including the electrodes 13Y and 14Y with the B cathodes the discharge may be shifted from the A cathode 11₄ in either direction, that is, up or down, in the Y coordinate dimension. Thus, it will be evident that in a device of the construction illustrated in Fig. 9 the discharge may be transferred selectively in accordance with the subtraction as well as addition of groups of pulses and may be utilized for example, for the algebraic summation of complex numbers. Also, of course, it may be utilized to effect switching in accordance with complex numbers or groups of such numbers.

Figure 10:
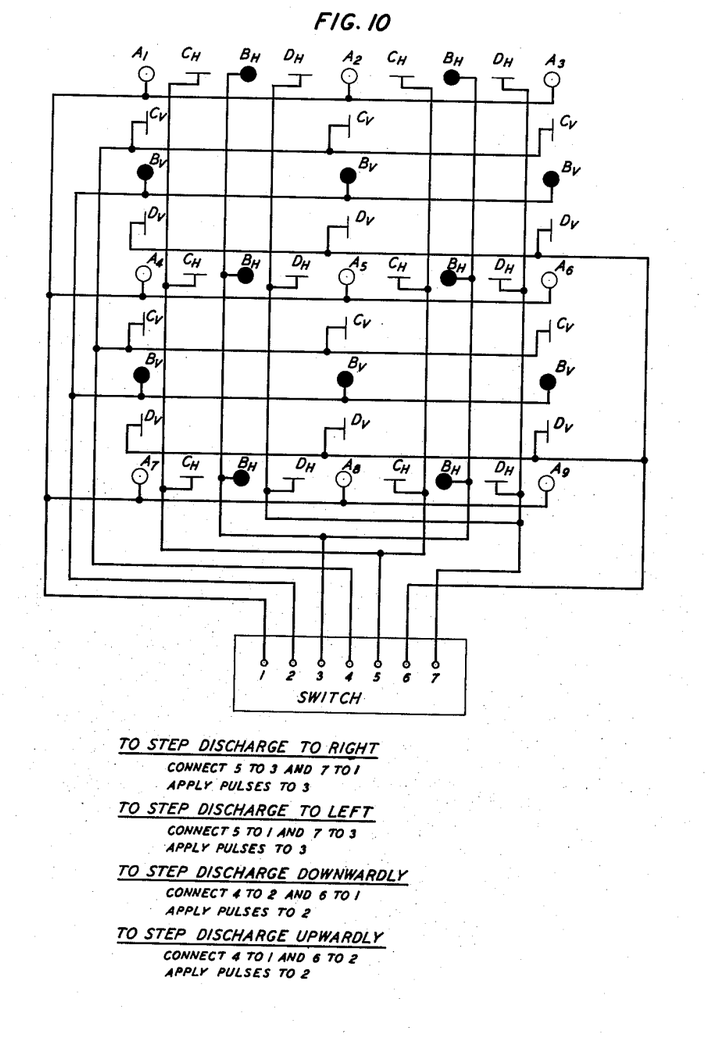
Fig. 10 is a circuit schematic showing one manner in which the device illustrated in Fig. 9 may be operated.

The circuitry requisite for such operation of the device illustrated in Fig. 9 is shown in Fig. 10. In Fig. 10, the A and B cathodes 11 and 12 depicted in Fig. 9A are designated by the letters A and B, and the auxiliary electrodes 13 and 14 of Fig. 9A are designated as C and D. The B, C and D electrodes bear a subscript H or V indicative of the direction of stepping in which the particular electrode is involved. As shown in Fig. 10, all electrodes similarly identified are connected together electrically to a respective one of the terminals 1 to 7, inclusive, of the switch S. The operation of this switch to effect stepping of the discharge in either direction of the two coordinate dimensions is set forth in the legend accompanying Fig. 10.

In the embodiment of this invention illustrated in Fig. 9B, which is a modification of that illustrated in Fig. 9A, the A and B cathodes 110 and 120 are short hollow cylinders of a refractory metal, such for example as molybdenum, the auxiliary electrodes 130' and 140' are rectilinear wires, also of a refractory metal such as molybdenum, mounted in a plane immediately adjacent the upper ends of the cathodes 110 and 120. The anode may be a flat sheet similar to the anode 160 illustrated in Fig. 8.

The device illustrated in Fig. 9B may be operated in the same manner as that illustrated in Fig. 9A and as described hereinbefore.

Figure 11:
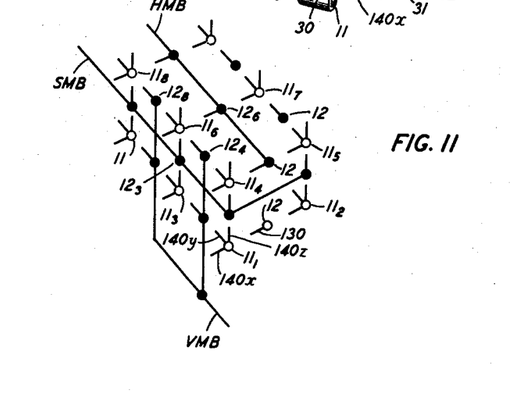
Fig. 11 is a diagram illustrating the construction and arrangement of the electrodes in another embodiment of this invention particularly suitable for selective stepping of the discharge in three coordinate dimensions.

The invention may be embodied also in devices capable of effecting stepping of the discharge in three coordinate dimensions. The basic construction and arrangement of the electrodes for such devices is illustrated in Fig. 11. As shown in this figure, each of the A cathodes 11 is provided with three auxiliary or tail portions 140X, 140Y and 140Z, extending respectively in the three coordinate dimensions. Opposite each of the A cathodes are a number of B cathodes 12 having auxiliary or tail portions 130, the B cathodes for each A cathode being disposed with respect thereto in the same relation as the auxiliary or tail portions of the A cathode whereby, as will be clear by the discussion hereinabove, the discharge obtaining at any A cathode may be stepped therefrom in any of the three coordinate dimensions. Specifically, for example, the discharge sustaining at the A cathode 11₆ may be stepped to the cathode 11₇ by application of a negative pulse to the group of B cathodes including B cathode 12₆; similarly the discharge sustaining at cathode 11₆ may be stepped to the A cathode 11₄ by application of a negative pulse to the group of B cathodes including B cathode 12₄; also, the discharge sustaining at A cathode 11₆ may be stepped to the A cathode 11₃ by application of a negative pulse to the group of B cathodes including 12₃. By similar analyses it will be evident that the discharge sustaining at any A cathode may be stepped selectively in any one of the three coordinate dimensions to the next adjacent A cathode in that dimension.

As illustrated in Figs. 11 and 14, all of the A cathodes are tied together electrically and all of the B cathodes involved in the stepping of the discharge in any one coordinate direction are similarly connected together electrically. Thus, the B cathodes are tied together in three groups leading to bus bars HMB, VMB and SMB. Pulses for effecting the stepping are applied to the bus bars by respective sources 18X, 18Y and 18Z.

Figure 12:
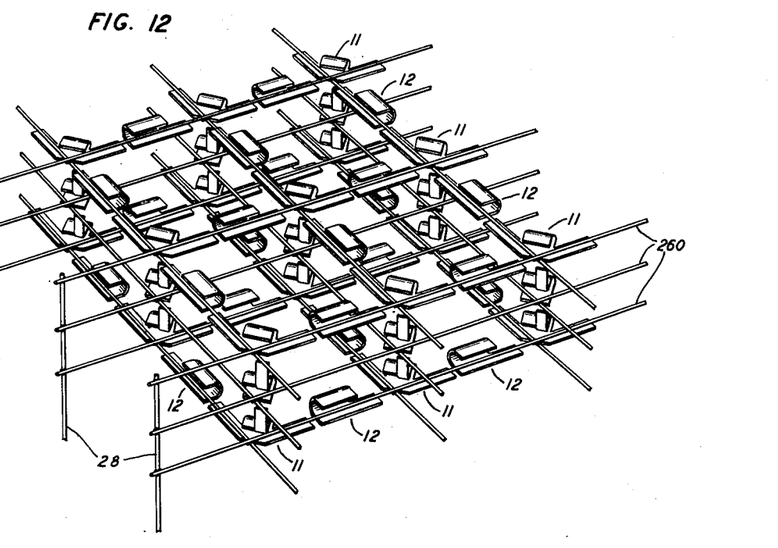
Fig. 12 is a perspective view showing one illustrative form of the electrodes in a device of the type illustrated in Fig. 11.
Figure 13:
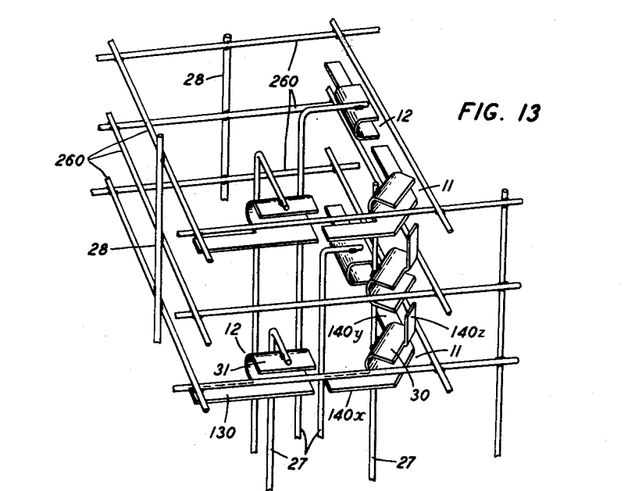
Fig. 13 is another perspective view of a portion of the device illustrated in Fig. 11 showing details of the construction and association of the electrodes.

One specific and illustrative physical construction and association of the electrodes in a device of the type illustrated in Fig. 11 is portrayed in Figs. 12 and 13. As shown in these figures, each of the A cathodes has a channel-shaped body portion 30 and three auxiliary or tail portions 140X, 140Y and 140Z extending in the three coordinate dimensions of the system. Each of the B cathodes includes a channel-shaped portion opposite a tail of an associated A cathode and an auxiliary or tail portion 130 extending toward the channel portion 30 of a corresponding A cathode. The A and B cathodes may be formed of sheet refractory metal, such for example as molybdenum. The anode is composed of a plurality of conductive rods or wires 260 oppositely aligned with the channels of A and B cathodes. The anode elements are mounted by one or more rigid conductors 28 and the A and B cathodes may be supported by individual leading-in conductors 27 as in the manner of the cathodes in the device illustrated in Fig. 3.

It will be appreciated that in devices in the construction illustrated in Figs. 11 to 14, inclusive, the discharge may be stepped in one direction in each of three coordinate dimensions. Bidirectional stepping of the discharge in each of these dimensions may be realized by use of auxiliary electrodes in the same manner as in the device shown in Figs. 1 and 9 and described hereinabove. Specifically, as illustrated in Fig. 15, each of the A cathodes is of channel-shaped form as in the device illustrated in Fig. 9A and has associated therewith separate auxiliary electrodes 130X, 130Y and 130Z each extending from immediately adjacent the A cathode. The auxiliary electrodes are arranged in pairs to effect stepping by each pair in either one of two directions of the dimension corresponding to that pair. The manner of electrical association of the A and B cathodes of the auxiliary electrodes in the device depicted in Fig. 15 will be apparent, it is believed, from the discussion hereinabove of the bidirectional two coordinate device of Fig. 8 and the circuit of Fig. 10.

Although specific embodiments of the invention have been shown and described it will be understood that they are but illustrative and that various modifications may be made therein without departing from the scope and spirit of this invention.

What is claimed is:

1. A gaseous discharge device comprising an array of cathodes, means connecting said cathodes electrically in two groups with the cathodes of the two groups in alternate relation, an anode opposite said cathodes, and means for stepping a discharge in either of two directions along said array comprising auxiliary electrode means one for each pair of adjacent cathodes, means for selectively connecting said auxiliary electrode means each to either of the adjacent cathodes and means for impressing signals between said two groups of cathodes.

2. A gaseous discharge device comprising two groups of glow cathodes mounted in a row with the cathodes of the two groups in alternate relation, means connecting the cathodes of each group together electrically, an anode opposite said cathodes, and means for stepping a discharge from any cathode in either direction along said row, said stepping means comprising a plurality of auxiliary electrode members one for each pair of adjacent cathodes and mounted therebetween, means for impressing signal pulses between said groups of cathodes and means for selectively connecting said auxiliary electrode members each to the next succeeding or next preceding cathode in said row.

3. A gaseous discharge device comprising a plurality of glow cathodes and a plurality of auxiliary electrodes mounted in alternate relation in an array, an anode opposite said cathodes and auxiliary electrodes, and means for selectively stepping a discharge from cathode to cathode in either direction in said array, said means comprising means for connecting each auxiliary electrode to either the next succeeding or next preceding cathode and means for driving each auxiliary electrode negative with respect to the cathode of the respective pair to which it is not connected.

4. A gaseous discharge device comprising a plurality of cathodes mounted in an array, means connecting said cathodes in two groups with the cathodes of the two groups in alternate relation, a plurality of auxiliary electrodes one for each pair of adjacent cathodes and positioned therebetween, means connecting said auxiliary electrodes in two groups with the electrodes of the two groups in alternate relation, and an anode opposite said cathodes.

5. A gaseous discharge device comprising a plurality of large area glow cathodes mounted in a row, a plurality of small area auxiliary electrodes, one for each pair of adjacent cathodes and mounted therebetween, an anode opposite said cathodes and electrodes, means connecting said cathodes in two groups with the cathodes of the two groups in alternate relation, and means connecting said auxiliary electrodes in two groups with the electrodes of the two groups in alternate relation.

6. A gaseous discharge device in accordance with claim 5 comprising means biasing said anode positive with respect to said cathodes and electrodes, means biasing one group of cathodes negative with respect to the other group of cathodes, and means for selectively connecting either group of auxiliary electrodes to one group of cathodes and the other group of electrodes to the other group of cathodes.

7. A gaseous discharge device comprising two grops of glow cathodes mounted in alternate relation, a plurality of auxiliary electrodes each mounted between a respective pair of adjacent cathodes, an anode opposite said cathodes and electrodes, means biasing said anode positive with respect to said cathodes and electrodes, means for pulsing one group of cathodes negative with respect to the other, and means for selectively connecting said auxiliary electrodes to either group of cathodes.

8. A gaseous discharge device comprising a plurality of channel-shaped glow cathodes mounted in end-to-end relation, a plurality of auxiliary electrodes one for each pair of adjacent cathodes and mounted therebetween, each auxiliary electrode having small area end portions in juxtaposition to the facing ends of the respective pair of cathodes, and an anode opposite said cathodes and electrodes.

9. A gaseous discharge device comprising a plurality of cathodes mounted in an array comprising rows extending in two coordinate dimensions, an anode opposite said cathodes, and means for stepping the discharge selectively from any cathode to a next adjacent one in either of said dimensions comprising a plurality of auxiliary electrodes one for each pair of adjacent cathodes and positioned therebetween.

10. A gaseous discharge device comprising a plurality of glow cathodes mounted in an array of rows extending in two coordinate dimensions, an anode opposite said cathodes, means connecting said cathodes together electrically, and means for stepping said discharge selectively from any of said cathodes to a next adjacent one in either of said dimensions comprising a plurality of auxiliary cathodes, one for each pair of adjacent cathodes of said first plurality and mounted therebetween and means for pulsing the auxiliary cathodes disposed in the direction of either of said dimensions, negative with respect to said first plurality of cathodes.

11. A gaseous discharge device comprising a plurality of glow cathodes mounted in an array including rows extending in two coordinate dimensions, an anode opposite said cathodes, means for stepping a discharge from cathode to cathode in one of said dimensions comprising a first group of auxiliary electrodes arrayed in rows extending in said one dimension, there being one auxiliary electrode between each pair of adjacent cathodes arrayed in said one dimension, and means for driving said group of auxiliary electrodes negative with respect to said cathodes, and means for stepping a discharge from cathode to cathode in the other of said dimensions comprising a second group of auxiliary electrodes disposed in rows in said other dimension and each positioned between two adjacent cathodes arrayed in said other dimension and means for pulsing said second group of electrodes negative with respect to said cathodes.

12. A gaseous discharge device comprising a plurality of glow cathodes mounted in an array composed of rows extending in two dimensions substantially normal to one another, an anode opposite said cathodes, a first means for stepping a discharge from cathode to cathode in one direction in one of said dimensions, and a second means for stepping a discharge from cathode to cathode in one direction in the other of said dimensions, said first and second means comprising means for establishing adjacent said cathodes an electric field for attracting the discharge at any cathode selectively in either of said directions.

13. A gaseous discharge device comprising a first glow cathode having a body portion and two tail portions extending from said body portion in two coordinate dimensions, a first pair of glow cathodes on opposite sides of said first cathode in one of said dimensions, a second pair of glow cathodes on opposite sides of said first cathode in the other of said dimensions, a plurality of auxiliary cathodes, one for each of the cathodes of said first and second pairs and positioned between it and said first cathode, each of said auxiliary cathodes having a body portion and a tail portion, the tail portions of the two auxiliary cathodes aligned in one dimension extending in the same direction with the tail portion of one terminating adjacent the body portion of said first cathode and the body portion of the other adjacent one of said tail portions of said first cathode, the tail portions of the other pair of auxiliary cathodes extending in the same direction with the tail portion of one terminating adjacent the body portion of said first cathode and the body portion of the other adjacent the other of said tail portions of said first cathode, and an anode opposite all of said cathodes.

14. A gaseous discharge device comprising a plurality of glow cathodes mounted in an array composed of rows extending in two coordinate dimensions, means connecting one group of alternate cathodes in both dimensions together, means connecting the other alternate cathodes in one dimension together, means connecting the other alternate cathodes in the other dimension together, all of said cathodes having a body portion, the cathodes of said one group having two tail portions extending in said two dimensions and each of said other alternate cathodes having a tail portion extending toward the body portion of a respective one of said group of cathodes, the tail portions of each group of said other alternate cathodes extending in the same direction and the tail portions of said one group of cathodes extending in the directions in which the tail portions of said other cathodes extend, and an anode opposite all of said cathodes.

15. A gaseous discharge device in accordance with claim 14 wherein said body portions are channel-shaped and each of said tail portions is of strip form and terminates in juxtaposition to one edge of the channel-shaped portion toward which it extends.

16. A gaseous discharge device comprising a plurality of glow cathodes mounted in an array of rows extending in two coordinate dimensions, an anode opposite said cathodes, and means for selectively stepping a discharge from cathode to cathode in either direction in either of said dimensions comprising auxiliary electrodes one for each pair of adjacent cathodes and disposed therebetween and means for selectively pulsing groups of said auxiliary electrodes, relative to said cathodes.

17. A gaseous discharge device comprising a plurality of glow cathodes mounted in an array composed of rows extending in two coordinate dimensions, means connecting one group of alternate cathodes in both of said dimensions together, a plurality of auxiliary electrodes one for each pair of adjacent cathodes and disposed therebetween, an anode opposite said cathodes and electrodes, and means for stepping a discharge from one cathode in said group to the next adjacent one in either direction in either dimension comprising means for pulsing prescribed groups of said auxiliary electrodes and of the cathodes other than those in said group, negative with respect to said group of cathodes.

18. A gaseous discharge device comprising a plurality of first cathodes mounted in an array composed of rows extending in two coordinate dimensions, a plurality of second glow cathodes, one for each pair of said first cathodes and mounted therebetween, a group of first auxiliary electrodes mounted in rows extending in one of said dimensions, there being one first auxiliary electrode between each pair of adjacent first and second cathodes arrayed in said one dimension, a group of second auxiliary electrodes mounted in rows extending in the other of said dimensions, there being one second auxiliary electrode between each pair of adjacent first and second cathodes arrayed in said other dimension, and an anode opposite said cathodes and auxiliary electrodes.

19. A gaseous discharge device in accordance with claim 18 wherein said cathodes are channel-shaped and adjacent cathodes are mounted in end-to-end relation and wherein said auxiliary electrodes are of strip form and each has its ends in juxtaposition to the respective pair of cathodes.

20. A gaseous discharge device in accordance with claim 18 wherein said cathodes are cylinders with their longitudinal axes parallel and substantially normal to said two dimensions and wherein said auxiliary electrodes are wires and each has its ends in proximity to the corresponding ends of the respective pair of adjacent cathodes.

21. A gaseous discharge device in accordance with claim 18 comprising means electrically connecting said first cathodes together, means electrically connecting the second cathodes arrayed in said one dimension into one set, means electrically connecting the second cathodes arrayed in said other dimension into a second set, means electrically connecting the auxiliary electrodes in each of said groups in two sets, each set being composed of alternate electrodes in the group, and means for selectively stepping a discharge from one of said first cathodes to the next adjacent first cathode in either direction in both of said dimensions comprising means for selectively interconnecting said sets of second cathodes and auxiliary electrodes and means for pulsing preassigned combinations of sets of second cathodes and auxiliary electrodes.

22. A gaseous discharge device comprising a plurality of glow cathodes mounted in an array composed of rows extending in three coordinate dimensions, an anode opposite said cathode, and means for stepping a discharge from cathode to cathode selectively in said three dimensions comprising a plurality of auxiliary electrodes one for each pair of adjacent cathodes and positioned therebetween.

23. A gaseous discharge device comprising a plurality of first glow cathodes mounted in an array composed of rows extending in three coordinate dimensions, each of said cathodes having a body portion and three tail portions extending in said dimensions respectively, a plurality of second glow cathodes, one for each pair of adjacent first cathodes and positioned therebetween, each of said second cathodes having a body portion in proximity to a tail portion of one of the respective adjacent cathodes and a tail portion extending into proximity to the body portion of the other of the respective adjacent cathodes, and an anode opposite said first and second cathodes.

WALLACE A. DEPP.

REFERENCES CITED

The following references are of record in the file of this patent:

UNITED STATES PATENTS

| Number | Name | Date |
|---|---|---|
| 2,443,407 | Wales, Jr. | June 15, 1948 |